US012295085B2

(12) United States Patent
Ok et al.

(10) Patent No.: US 12,295,085 B2
(45) Date of Patent: May 6, 2025

(54) INDUCTION HEATING DEVICE WITH IMPROVED CONTROL ALGORITHM

(71) Applicant: LG Electronics Inc., Seoul (KR)

(72) Inventors: Seungbok Ok, Seoul (KR); Byeong Wook Park, Seoul (KR); Jae-Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 525 days.

(21) Appl. No.: 16/766,595

(22) PCT Filed: Nov. 28, 2018

(86) PCT No.: PCT/KR2018/014881
§ 371 (c)(1),
(2) Date: May 22, 2020

(87) PCT Pub. No.: WO2019/135492
PCT Pub. Date: Jul. 11, 2019

(65) Prior Publication Data
US 2021/0127459 A1    Apr. 29, 2021

(30) Foreign Application Priority Data
Jan. 8, 2018  (KR) .......................... 10-2018-0002326

(51) Int. Cl.
*H05B 6/06*   (2006.01)
*H05B 6/12*   (2006.01)
(52) U.S. Cl.
CPC ........... *H05B 6/065* (2013.01); *H05B 6/1272* (2013.01)
(58) Field of Classification Search
CPC ....................... F24C 7/06; H05B 1/02–1/0297
See application file for complete search history.

(56) References Cited

U.S. PATENT DOCUMENTS

2002/0117497 A1*  8/2002  Bassill .................. H05B 6/062
                                                          219/626
2011/0240632 A1  10/2011  Falcon et al.
(Continued)

FOREIGN PATENT DOCUMENTS

EP    2736305    5/2014
EP    2928265    10/2015
(Continued)

OTHER PUBLICATIONS

Extended European Search Report in European Appln. No. 18898822.4, dated Sep. 7, 2021, 9 pages.

*Primary Examiner* — John J Norton
*Assistant Examiner* — Theodore J Evangelista
(74) *Attorney, Agent, or Firm* — Fish & Richardson P.C.

(57) ABSTRACT

An induction heating device includes a working coil group including a first working coil and a second working coil that are electrically connected in parallel to each other, an inverter configured to perform a switching operation to supply resonance current to at least one of the first or second working coil; a first semiconductor switch electrically connected to the first working coil to turn on and turn off the first working coil; a second semiconductor switch electrically connected to the second working coil to turn on and turn off the second working coil; and a controller configured to control operation of the inverter and the first and second semiconductor switches, respectively. The controller turns off the inverter before turning off at least one of the first semiconductor switch or the second semiconductor switch.

15 Claims, 7 Drawing Sheets

(56) References Cited

U.S. PATENT DOCUMENTS

| | | | |
|---|---|---|---|
| 2012/0103971 A1 | 5/2012 | Oh et al. | |
| 2012/0152935 A1 | 6/2012 | Kitaizumi et al. | |
| 2012/0187107 A1* | 7/2012 | Liu | H02M 5/458 |
| | | | 219/492 |
| 2013/0015776 A1* | 1/2013 | Simi | H05B 45/39 |
| | | | 315/206 |
| 2014/0008356 A1* | 1/2014 | Uchida | H05B 6/101 |
| | | | 219/672 |

FOREIGN PATENT DOCUMENTS

| | | |
|---|---|---|
| EP | 3678453 | 7/2020 |
| KR | 20070114489 | 12/2007 |
| KR | 20100120015 | 11/2010 |
| KR | 20110092071 | 8/2011 |
| KR | 20110092071 A * | 8/2011 |
| KR | 101659001 | 9/2016 |
| KR | 20170123821 | 11/2017 |

* cited by examiner

INDUCTION HEATING DEVICE WITH IMPROVED CONTROL ALGORITHM

TECHNICAL FIELD

The present disclosure relates to an induction heating device with an improved control algorithm.

BACKGROUND

Various types of cooking apparatuses may be used to heat food at homes and restaurants. For example, gas stoves may use gas as fuel to heat food. In some cases, cooking apparatuses may heat an object such as a cooking container including, for example, a pot using electricity instead of gas.

Methods for heating an object using electricity may be classified as a resistance heating method and an induction heating method. In the resistance heating method, an object may be heated by heat that is generated when electric current flows through a metallic resistance wire, or through a non-metallic heating element such as silicon carbide, and the heat may be delivered to the object through radiation or conduction. In the induction heating method, an object (e.g., a cooking container) itself may be heated by eddy current that are generated in the object made of metallic ingredients, using a magnetic field generated around a coil when a predetermined magnitude of high-frequency power is supplied to the coil.

In some examples, an induction heating device may include a working coil at an area corresponding to each of the plurality of objects (e.g., a cooking container) to heat each object.

In some cases, an induction heating device (i.e., a zone free-type induction heating device) may simultaneously heat a single object using a plurality of working coils.

The zone free-type induction heating device can inductively heat an object in an area where a plurality of working coils are provided regardless of a size and position of the object.

FIG. 1 is a schematic view illustrating a zone free-type induction heating device in related art.

As illustrated in FIG. 1, the zone free-type induction heating device 10 of the related art includes semiconductor switches (T1 to Tn) that respectively switch coils and that are electrically connected to a plurality of induction coils (L1 to Ln) to control an individual output of the plurality of induction coils (L1 to Ln). For example, the semiconductor switch (T1 to Tn) is turned on/turned off individually to control an output of each induction coil (L1 to Ln).

In some cases, when a semiconductor switch (e.g., T1) is turned off while resonance current flows in the semiconductor switch (T1), switch stress may be applied to the semiconductor switch (T1) according to a formula L*di/dt, where L denotes inductance, di denotes a change on resonance current, and dt denotes a change in time, of counter electromotive force in relation to the induction coil. In some cases, the switch stress may damage the semiconductor switch (T1) due to an increase in an amount of generated heat.

In some cases, the zone free-type induction heating device 10 may additionally include a freewheeling diode (D1 to Dn) corresponding to each semiconductor switch (T1 to Tn) to reduce switch stress.

In some cases, the addition of a freewheeling diode results in an increase in an amount of generated heat due to heat generated in the freewheeling diode (D1 to Dn) itself, and an increase in costs and the surface area of a circuit of the zone free-type induction heating device 10.

SUMMARY

The present disclosure describes an induction heating device that may independently control an output of a plurality of working coils.

The present disclosure also describes an induction heating device that may reduce switch stress without a freewheeling diode.

The present disclosure further describes an induction heating device in which a relay and a freewheeling diode may be removed, thereby removing noise that can occur when the relay performs a switching operation and reducing a volume of a circuit of the induction heating device.

Aspects of the present disclosure are not limited to the above-described ones. Additionally, other aspects and advantages that have not been mentioned can be clearly understood from the following description and can be more clearly understood from implementations. Further, it will be understood that the aspects and advantages of the present disclosure can be realized via means and combinations thereof that are described in the appended claims.

According to one aspect of the subject described in this application, an induction heating device includes a working coil group including a first working coil and a second working coil that are electrically connected in parallel to each other, an inverter configured to perform a switching operation to thereby supply a resonance current to at least one of the first working coil or the second working coil, a first semiconductor switch electrically connected to the first working coil and configured to turn on and turn off the first working coil, a second semiconductor switch electrically connected to the second working coil and configured to turn on and turn off the second working coil, and a controller configured to control operation of each of the inverter, the first semiconductor switch, and the second semiconductor switch. The controller is configured to turn off the inverter before turning off at least one of the first semiconductor switch or the second semiconductor switch.

Implementations according to this aspect may include one or more of the following features. For example, the controller may be configured to supply a first control signal having a first pulse width to the first semiconductor switch and control operation of the first semiconductor switch based on the first control signal, and supply a second control signal having a second pulse width to the second semiconductor switch and control operation of the second semiconductor switch based on the second control signal. In some examples, the first pulse width and the second pulse width are different from each other.

In some implementations, the controller may be configured to turn on the first semiconductor switch during a first period corresponding to the first pulse width, and turn on the second semiconductor switch during a second period corresponding to the second pulse width. In some examples, the controller may be configured to stop supplying the first control signal at an end of the first period while maintaining supply of the second control signal, and turn off the inverter prior to the end of the first period, and turn on the inverter again after the end of the first period while maintaining supply of the second control signal.

In some implementations, the controller may be configured to stop supplying both of the first control signal and the second control signal at a specific time point after the first period and the second period, and turn off the inverter prior to the specific time point. In some examples, the controller may be configured to, by turning on the first semiconductor switch, turn on the first working coil, and by turning on the second semiconductor switch, turn on the second working coil. In some examples, the controller may be configured to adjust the first pulse width to thereby control a first output of the first working coil, and adjust the second pulse width to thereby control a second output of the second working coil.

In some implementations, the induction heating device may further include a power supply configured to output alternating current (AC) power, and a rectifier configured to convert the AC power output from the power supply into direct current (DC) power and to supply the DC power to the inverter. In some examples, the controller may be configured to control operation of at least one of the inverter, the first semiconductor switch, or the second semiconductor switch based on an AC voltage corresponding to the AC power being zero.

According to another aspect, an induction heating device includes a working coil group including a first working coil and a second working coil that are electrically connected in parallel to each other, an inverter configured to perform a switching operation to thereby supply a resonance current to at least one of the first working coil or the second working coil, a rectifier configured to convert alternating current (AC) power received from a power supply into direct current (DC) power and to supply the DC power to the inverter, a first semiconductor switch electrically connected to the first working coil and configured to turn on and turn off the first working coil, a second semiconductor switch electrically connected to the second working coil and configured to turn on and turn off the second working coil, and a controller configured to control operation of each of the inverter, the first semiconductor switch, the second semiconductor switch. The controller is configured to control operation of at least one of the inverter, the first semiconductor switch, or the second semiconductor switch based on an AC voltage corresponding to the AC power being zero.

According to another aspect, an induction heating device includes a working coil group including a first working coil and a second working coil that are electrically connected in parallel to each other, an inverter configured to perform switching operation to thereby supply resonance current to at least one of the first working coil or the second working coil, a first semiconductor switch electrically connected to the first working coil and configured to turn on and turn off the first working coil, a second semiconductor switch electrically connected to the second working coil and configured to turn on and turn off the second working coil, and a controller configured to control operation of each of the inverter, the first semiconductor switch, and the second semiconductor switch. The controller is configured to supply a first control signal having a first pulse width to the first semiconductor switch, and to supply a second control signal having a second pulse width different from the first pulse width to the second semiconductor switch.

Implementations according to this aspect may include one or more of the following features. For example, the controller may be configured to adjust the first pulse width to thereby control a first output of the first working coil, and adjust the second pulse width to thereby control a second output of the second working coil. In some implementations, the controller may be configured to maintain the second control signal during a first period corresponding to the first pulse width and a first off period for which the first semiconductor switch is turned off after the first period. In some examples, the controller may be configured to turn off the inverter before the first off period.

In some implementations, the first control signal may include a plurality of pulses and an off period between two pulses of the plurality of pulses, and the controller may be configured to turn off the inverter at a first time point before a start of the off period and turn on the inverter at a second time point before an end of the off period. In some examples, a period between the first time point and the second time point may be less than the off period.

In some implementations, the controller may be configured to maintain the second control signal during periods corresponding to the plurality of pulses and the off period between the two pulses of the plurality of pulses. In some examples, each of pulse widths of the plurality of pulses is less than the second pulse width. In some examples, the first pulse width may be less than the second pulse width.

In some implementations, the induction heating device may include a controller that may respectively control operation of an inverter and a plurality of semiconductor switches, thereby controlling an output of a plurality of working coils independently.

In some implementations, the induction heating device may include a controller that may turn off an inverter before turning off a semiconductor switch, thereby reducing switch stress without a freewheeling diode.

In some implementations, the induction heating device may perform control over an output of a working coil using a semiconductor switch and a controller instead of a relay and a freewheeling diode, thereby removing noise that is generated when the relay performs switching operation and reducing volume of a circuit.

In some implementations, the induction heating device may separate a plurality of working coils independently and may turn on and turn off the same at a high speed through a semiconductor switch and a controller, thereby ensuring independent output control over the plurality of working coils. Further, the controller may perform control over an inverter and a semiconductor switch at a time point when an input voltage of a power supply becomes zero, thereby minimizing an adverse effect (i.e., loss) on the device even in case of a delay caused by an abnormal situation that happens during its control.

In some implementations, the induction heating device may turn off the inverter before turning off the semiconductor switch, thereby reducing switch stress without a freewheeling diode. Further, a reduction in switch stress may result in a reduction in an amount of heat generated in the semiconductor switch, thereby ensuring improved durability and credibility of the induction heating device.

In some implementations, the induction heating device may perform control over an output of the working coil using the semiconductor switch and the controller instead of a relay and a freewheeling diode, thereby reducing noise generated at the time of the switchover operation of a relay and satisfying the needs of users. In some implementations, the induction heating device may be used even during a period for which people are sensitive to noise (e.g., at dawn or late at night), thereby ensuring improved usability. Further, the entire volume of the induction heating device as well as the volume of a circuit may be reduced as a relay and a freewheeling diode, which otherwise occupy a large volume of the circuit, are removed from the device, thereby ensuring improved usability of space.

Detailed effects of the present disclosure are described together with the above-described effects in the detailed description of the disclosure.

DETAILED DESCRIPTION

Figure 1:
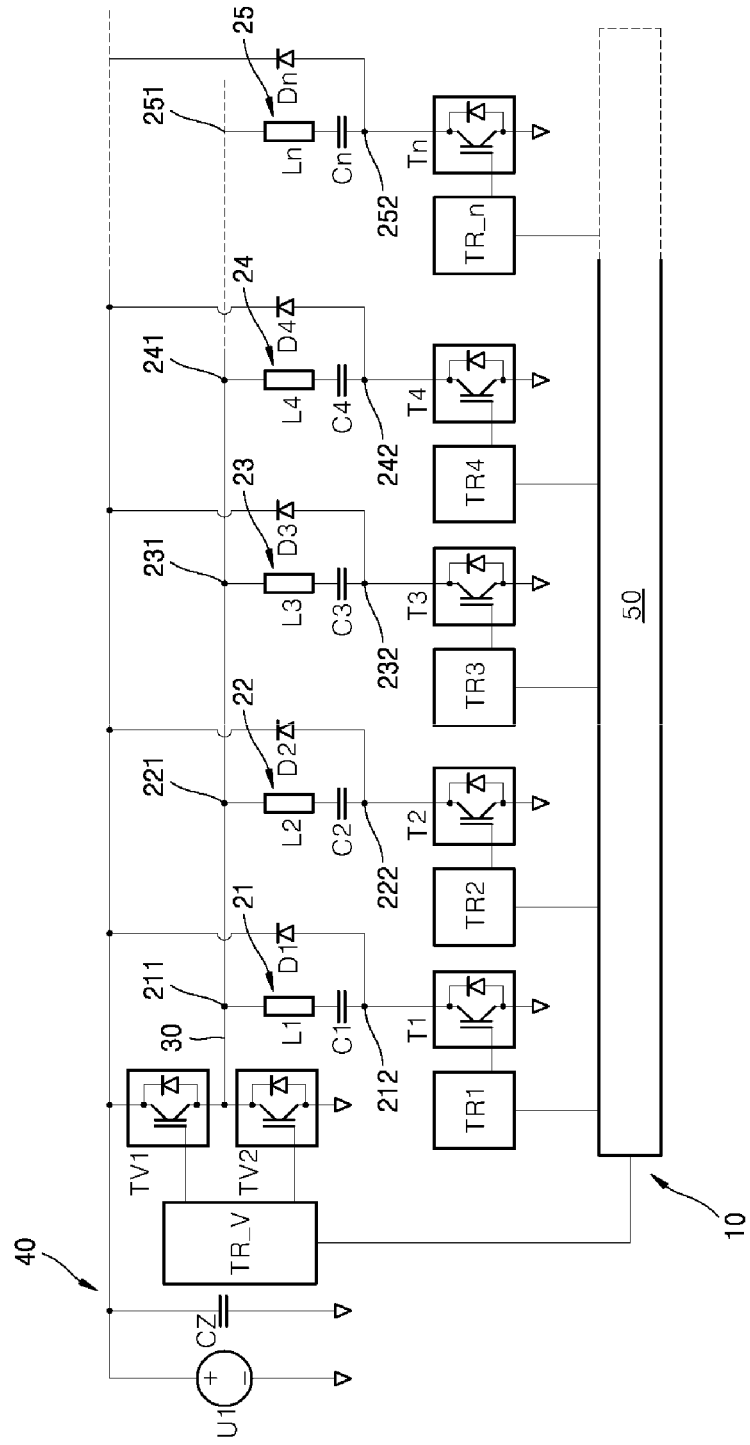
FIG. 1 is a schematic view illustrating a zone free-type induction heating device in related art.

Below, one or more implementations of the present disclosure are described with reference to the accompanying drawings. Throughout the drawings, like reference numerals denote like elements.

Figure 2:
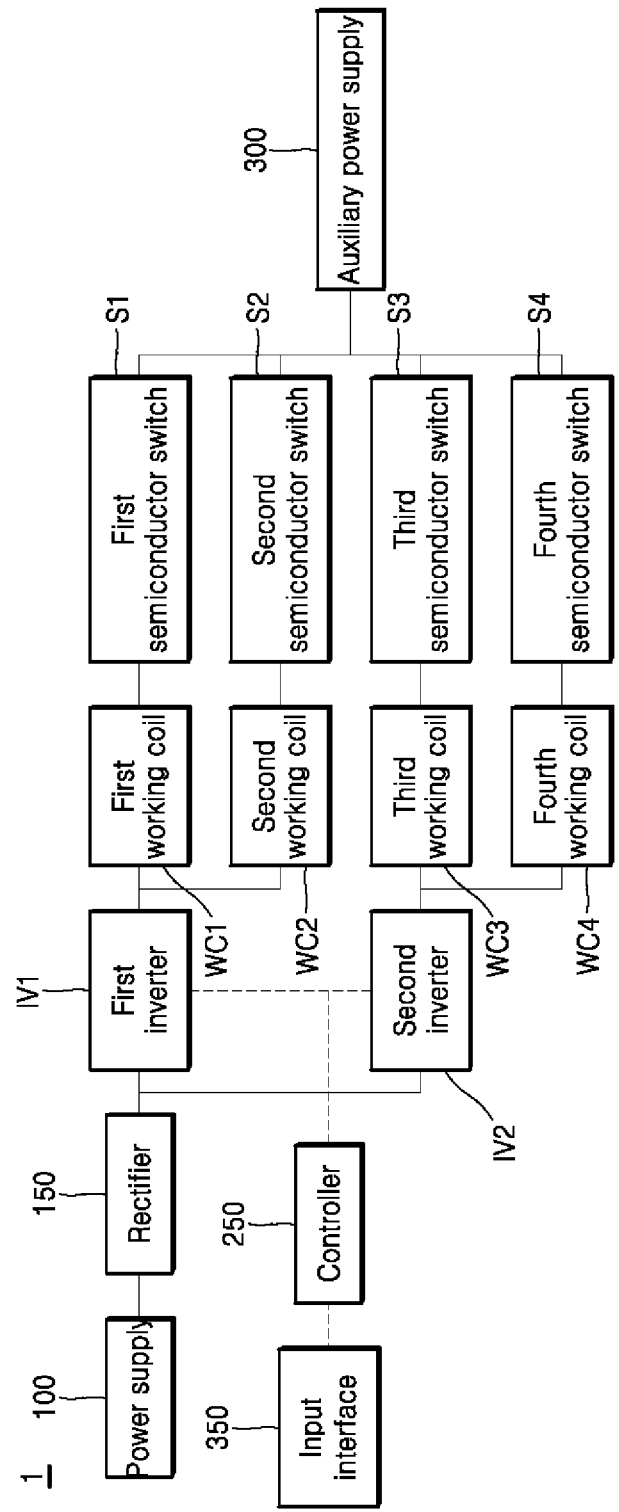
FIG. 2 is a block diagram illustrating an example of an induction heating device according to the present application.

FIG. 2 is a block diagram illustrating an example of an induction heating device according to the present application.

Referring to FIG. 2, the induction heating device 1 may include a power supply 100, a rectifier 150, first and second inverters (IV1 and IV2), a controller 250, first to fourth working coils (WC1 to WC4), first to fourth semiconductor switches (S1 to S4), an auxiliary power supply 300, and an input interface 350.

The number of some of the components (e.g., an inverter, a working coil, a semiconductor switch and the like) of the induction heating device 1 in FIG. 2 may vary in various implementations.

The power supply 100 may output alternating current (AC) power.

The power supply 100 may output AC power and may supply the AC power to the rectifier 150. The power supply 100, for example, may be a commercial power supply.

The rectifier 150 may convert AC power received from the power supply 100 into direct current (DC) power and may supply the DC power to at least one of the first inverter (IV1) and the second inverter (IV2).

The rectifier 150 may rectify AC power received from the power supply 100 and may convert the AC power into DC power.

In some implementations, the DC power rectified by the rectifier 150 may be supplied to a filter, and the filter may remove an AC component left in the DC power. The DC power rectified by the rectifier 150 may be supplied to the DC link capacitor (a smoothing capacitor), and the DC link capacitor may reduce a ripple of the DC power.

The DC power rectified by the rectifier 150 and the filter (or a DC link capacitor) may be supplied to at least one of the first and second inverters (IV1 and IV2).

The first inverter (IV1) may supply resonance current to at least one of the first and second working coils (WC1 and WC2) by performing switching operation.

The switching operation of the first inverter (IV1) may be controlled by the controller 250. That is, the first inverter (IV1) may perform switching operation on the basis of switching signals received from the controller 250.

The first inverter (IV1) may include two switching elements, and the two switching elements may be alternately turned on and turned off by the switching signals received from the controller 250.

High-frequency alternating current (i.e., resonance current) may be generated by switching operation of the two switching elements, and the generated high-frequency alternating current may be supplied to at least one of the first and second working coils (WC1 and WC2).

Likewise, the second inverter (IV2) may supply resonance current to at least one of the third and fourth working coils (WC3 and WC4) by performing switching operation.

The switching operation of the second inverter (IV2) may be controlled by the controller 250. That is, the second inverter (IV2) may perform switching operation on the basis of switching signals received from the controller 250.

The second inverter (IV2) may include two switching elements, and the two switching elements may be alternately turned on and turned off by the switching signals received from the controller 250.

High-frequency alternating current (i.e., resonance current) may be generated through the switching operation of the two switching elements, and the generated high-frequency alternating current may be supplied to at least one of the third and fourth working coils (WC3 and WC4).

The controller 250 may respectively control operation of the first and second inverters (IV1 and IV2) and operation of the first to fourth semiconductor switches (S1 to S4). For example, the controller 250 may include an electric circuit, a microprocessor, a computer, a communication device, or the like.

The switching operation of the first and second inverters (IV1 and IV2) may be controlled according to switching signals of the controller 250, and the first to fourth semiconductor switches (S1 to S4) may be turned on or turned off in a consecutive order or in a specific order or at the same time according to control signals of the controller 250. For example, when the first inverter (IV1) may be driven by a switching signal of the controller 250 and the first semiconductor switch (S1) is turned on by a control signal of the controller 250, resonance current may be supplied to the first working coil (WC1).

As described above, an object placed at an upper portion of the first working coil (WC1) may be heated by the resonance current supplied to the first working coil (WC1).

In some implementations, the controller 250 may control operation of the inverter (IV1 and IV2) and the semiconductor switch (S1 to S4) at the time when an input voltage of the power supply 100 (i.e., an AC voltage corresponding to AC power) becomes zero. Accordingly, even in case of a delay caused by an abnormal situation that happens while the controller 250 performs control, an adverse effect (i.e., loss) on the device may be minimized.

In some implementations, the controller 250 may control operation of the inverter (IV1 and IV2) and the semiconductor switch (S1 to S4) at the time when the input voltage from the power supply 100 becomes a preset threshold value. The preset threshold value may be zero in some examples.

The controller 250 may control another component in addition to the inverter (IV1 and IV2) and the semiconductor switch (S1 to S4) and may also perform control over another component at a time point when an output voltage of the power supply 100 becomes zero. For example, the controller 250 may control operation of the inverter (IV1 and IV2) and the semiconductor switch (S1 to S4) at the time point when an output voltage of the power supply 100 becomes zero, is described.

In some examples, the semiconductor switches S1 to S4 may include a metal switch, a semiconductor switch, an electric circuit, an electric component, a transistor, metal oxide semiconductor field effect transistor (MOSFET), insulated-gate bipolar transistor (IGBT), a diode, or the like.

In some implementations, the controller 250 may generate various switching signals or various control signals through a pulse width modulation (PWM) function.

The controller 250, for example, may generate first to fourth control signals having different pulse widths (i.e., duty) and may supply the generated first to fourth control signals respectively to the first to fourth semiconductor switches (S1 to S4), thereby independently controlling the first to fourth semiconductor switches (S1 to S4).

Furthermore, the controller 250 may control an output of each of the working coils (WC1 to WC4) by adjusting the pulse width of each control signal. Detailed description in relation this is provided hereunder.

In some examples, the induction heating device 1 may perform the function of wireless power transmission.

In recent years, technologies for wirelessly supplying power have been developed and have been widely used for various types of electronic devices. A battery of an electronic device, to which the wireless power transmitting technology is applied, can be charged only by being placed on a charge pad without connecting to an additional charge connector.

Accordingly, the electronic device, to which the wireless power transmitting technology is applied, may not include a cable or charger, thereby ensuring improved mobility and a reduced size and weight.

The wireless power transmitting technology can be broadly classified as an electromagnetic induction technology using a coil, and a resonance technology using resonance, a radio emission technology for converting electric energy into microwaves and delivering the microwaves, and the like. Among the technologies, the electromagnetic induction technology is a technology in which power is transmitted using electromagnetic induction between a primary coil (e.g., the working coil (WC)) provided at an apparatus for wirelessly transmitting power and a secondary coil provided at an apparatus for wirelessly receiving power.

The theory of the induction heating technology of the induction heating device 1 is substantially the same as that of the wireless power transmitting technology using electromagnetic induction, in that an object is heated through electromagnetic induction.

In this context, the induction heating device 1 may perform the function of wireless power transmission as well as the function of induction heating.

Accordingly, the controller 250 may control driving mode, i.e., induction heating mode or wireless power transmitting mode of the induction heating device 1.

That is, when the controller 250 sets driving mode of the induction heating device 1 to wireless power transmitting mode, at least one of the first to fourth working coils (WC1 to WC4) may operate and may wirelessly transmit power to an object.

When the controller 250 sets driving mode of the induction heating device 1 to induction heating mode, at least one of the first to fourth working coils (WC1 to WC4) may operate and may heat an object.

Additionally, the controller 250 may determine the number of the working coils to be driven through its control. On the basis of the number of the working coils to be driven, an amount of transmitted power or heating intensity of the induction heating device 1 may differ. Further, the controller 250 may control intensity of output of the working coil (WC1 to WC4) by adjusting a pulse width of a control signal supplied to the semiconductor switch (S1 to S4).

The controller 250 may determine which working coil is to be driven on the basis of the position of an object (i.e., an object), and may also determine whether switching signals between working coils to be driven are synchronized or not.

The controller 250 may also detect resonance current flowing in the first to fourth working coils (WC1 to WC4), and, on the basis of a detected value, may determine a working coil where an object is placed among the first to fourth working coils (WC1 to WC4).

The controller 250 may also determine whether an object is a magnetic one or a non-magnetic one on the basis of the detected value.

When an object placed at the upper portion of the induction heating device 1 is a magnetic one, the working coil resonates while a large amount of eddy current are induced from the working coil to the object. Accordingly, relatively small resonance current flow in the working coil. When no object is placed at the upper portion of the induction heating device 1, or when a non-magnetic object is placed at the upper portion of the induction heating device 1, the working coil does not resonate. Accordingly, relatively large resonance current flow in the working coil.

In some examples, the controller 250 may determine that an object to be driven is a magnetic one when a resonance current flowing in a working coil is smaller than a pre-configured reference current. Conversely, the controller 250 may determine that an object to be driven is a non-magnetic one when a resonance current flowing in a working coil is larger than or equal to a pre-configured reference current.

In some implementations, the induction heating device 1 may further include a detector that detects resonance current flowing in the working coil (WC1 to WC4), and the detector may also perform the above-describe function of detecting an object.

One example, in which the controller 250 performs the function of detecting an object, is described.

The first and second working coils (WC1 and WC2) may connect in parallel with each other.

Specifically, the first and second working coils (WC1 and WC2) may connect in parallel with each other and may receive resonance current from the first inverter (IV1).

That is, when driving mode of the induction heating device 1 is induction heating mode, eddy current may be generated between an object and the first working coils (WC1) or the second working coils (WC2) by high-frequency alternating current supplied from the first inverter (IV1) to at least one of the first and second working coils (WC1 and WC2), and the object may be heated.

When driving mode of the induction heating device 1 is wireless power transmitting mode, a magnetic field may be generated in a corresponding working by high-frequency alternating current supplied from the first inverter (IV1) to at least one of the first and second working coils (WC1 and WC2). Accordingly, electric current may also flow in a coil inside the object corresponding to the working coil, and the object may be charged by the electric current flowing in the coil inside the object.

The first working coil (WC1) may be electrically connected to the first semiconductor switch (WC1), and the second working coil (WC2) may be electrically connected to the second semiconductor switch (S2).

Accordingly, each working coil may be turned on or turned off at high speed by a semiconductor switch corresponding to each working coil.

The third and fourth working coils (WC3 and WC4) may connect in parallel with each other.

Specifically, the third and fourth working coils (WC3 and WC4) may connect in parallel with each other and may receive resonance current from the second inverter (IV2).

That is, when driving mode of the induction heating device 1 is induction heating mode, eddy current may be generated between an object and the third working coils (WC3) or the fourth working coils (WC4) by high-frequency alternating current supplied from the second inverter (IV2) to at least one of the third and fourth working coils (WC3 and WC4), between the working coil and the object, and the object may be heated.

When driving mode of the induction heating device 1 is wireless power transmitting mode, a magnetic field may be generated in a corresponding working by high-frequency alternating current supplied from the second inverter (IV2) to at least one of the third and fourth working coils (WC3 and WC4).

The third working coil (WC3) may be electrically connected to the third semiconductor switch (S3), and the fourth working coil (WC4) may be electrically connected to the fourth semiconductor switch (S4).

Accordingly, each working coil may be turned on or turned off at high speed by a semiconductor switch corresponding to each working coil.

The turn-on or turn-off of the working coil by the semiconductor switch denotes blocking or unblocking a flow of resonance current supplied from the inverter to the working coil by the semiconductor switch.

Each of the first to fourth semiconductor switches (S1 to S4) may be electrically connected to each of the first to fourth working coils (WC1 to WC4) to turn on and turn off the first to fourth working coils and may receive power from the auxiliary power supply 300.

Specifically, the first semiconductor switch (S1) may connect to the first working coil (WC1) and may turn on and turn off the first working coil (WC1), and the second semiconductor switch (S2) may connect to the second working coil (WC2) and may turn on and turn off the second working coil (WC2).

The first and second semiconductor switches (S1 and S2) may be driven to keep pace with the first inverter (IV1) by the controller 250, and may be used to detect whether an object is placed on the first and second working coils (WC1 and WC2) or may be used to control an output of the first and second working coils (WC1 and WC2).

Additionally, the controller 250 may block resonance current from flowing in a turned-off semiconductor switch by turning off the first inverter (IV1) before turning off at least one of the first and second semiconductor switches (S1 and S2). By doing so, switch stress applied to the turned-off semiconductor switch may be reduced.

The third semiconductor switch (S3) may connect to the third working coil (WC3) and may turn on and turn off the third working coil (WC3), and the fourth semiconductor switch (S4) may connect to the fourth working coil (WC4) and may turn on and turn off the fourth working coil (WC4).

The third and fourth semiconductor switches (S3 and S4) may be driven to keep pace with the second inverter (IV2) by the controller 250, and may be used to detect whether an object is placed on the third and fourth working coils (WC3 and WC4) or may be used to control an output of the third and fourth working coils (WC3 and WC4).

The controller 250 may block resonance current from flowing in a turned-off semiconductor switch by turning off the second inverter (IV2) before turning off at least one of the third and fourth semiconductor switches (S3 and S4). By doing so, switch stress applied to the turned-off semiconductor switch may be reduced.

The first to fourth semiconductor switches (S1 to S4), for example, may include a static switch. Additionally, for example, a metal oxide semiconductor field effect transistor (MOSFET), or an insulated gate bipolar mode transistor (IGBT) may be applied to the first to fourth semiconductor switches (S1 to S4).

The auxiliary power supply 300 may supply power to the first to fourth semiconductor switches (S1 to S4).

In some implementations, the auxiliary power supply 300 may have a single output structure (i.e., a single output terminal). For instance, the auxiliary power supply 300 may supply power to the first to fourth semiconductor switches (S1 to S4) as a single output. The auxiliary power supply 300 with a single output structure may include fewer pins for a connection with the first to fourth semiconductor switches (S1 to S4) than an auxiliary power supply with a multiple output structure.

When capacity of a single output is too large (that is, far beyond a pre-configured reference capacity), the auxiliary power supply 300 may be designed to have a double output structure (a structure in which each of the output terminals divides a single output capacity into a capacity less than or equal to a pre-configured reference capacity).

The auxiliary power supply 300, for example, may include a switched mode power supply (SMPS) but may not be limited.

The input interface 350 may receive an input from a user and may supply the input to the controller 250.

The input interface 350, which is a module for inputting heating intensity desired by the user or a driving period of the induction heating device and the like, may be implemented as a physical button, or a touch panel and the like in various ways.

The input interface 350, for example, may be provided with a power button, a lock button, a power level adjustment button (+, −), a timer adjustment button (+, −), a charge mode button and the like.

The input interface 350 may supply received input information to the controller 250, and the controller 250 may drive the induction heating device 1 in various ways on the basis of the input information received from the input interface 350. Examples in relation to this are described as follows.

When the user touches the power button provided at the input interface 350 for a predetermined period in a state in which the induction heating device 1 does not operate, the induction heating device 1 may start to operate. When the user touches the power button for a predetermined period in a state in which the induction heating device 1 is operating, the induction heating device 1 may stop operating.

When the user touches the lock button for a predetermined period, all the other buttons may be in a non-operational state. Then when the user touches the lock button for a predetermined period again, all the other buttons may be in an operational state.

When the user touches the power level adjustment button (+, −) in a state in which power is input, a current power level of the induction heating device 1 may be displayed on the input interface 350 as numbers. With a touch of the power level adjustment button (+, −), the controller 250 may confirm that driving mode of the induction heating device 1 is induction heating mode. Further, the controller 250 may adjust frequencies for switching operation of the first and second inverters (IV1 and IV2) to correspond to an input power level.

The user may set a driving period of the induction heating device 1 by touching the timer adjustment button (+, −). The controller 250 may finish driving of the induction heating device 1 when the driving period set by the user is over.

In this situation, when the induction heating device 1 operates in induction heating mode, the driving period of the induction heating device 1, which is set by the timer adjustment button (+, −), may be a period of heating an object. When the induction heating device 1 operates in wireless power transmitting mode, a driving period of the induction heating device 1, which is set by the timer adjustment button (+, −), may be a period of charging an object.

When the user touches the charge mode button, the induction heating device 1 may operate in wireless power transmitting mode.

In this situation, the controller 250 may receive device information on an object through communication with the object placed at a driving area (i.e., an upper portion of the working coil). The device information transmitted from the object, for example, may include information on the type of the object, charge mode, a required amount of power.

The controller 250 may determine the type of an abject, and may find out charge mode of an object, on the basis of the received device information.

The charge mode of an object may include ordinary charge mode and high-speed charge mode.

Accordingly, the controller 250 may adjust a frequency of at least one of the first and second inverters (IV1 and IV2) on the basis of the confirmed charge mode. For example, in a high-speed charge mode, the controller 250 may adjust a frequency such that bigger resonance current are supplied to the working coil on the basis of switching operation of the inverter.

The charge mode of an object may also be input by the user through the input interface 350.

The induction heating device 1 may have the above-described features and configurations.

Below, the above-described features and configurations of the induction heating device 1 are specifically described with reference to FIGS. 3 to 5.

Figure 3:
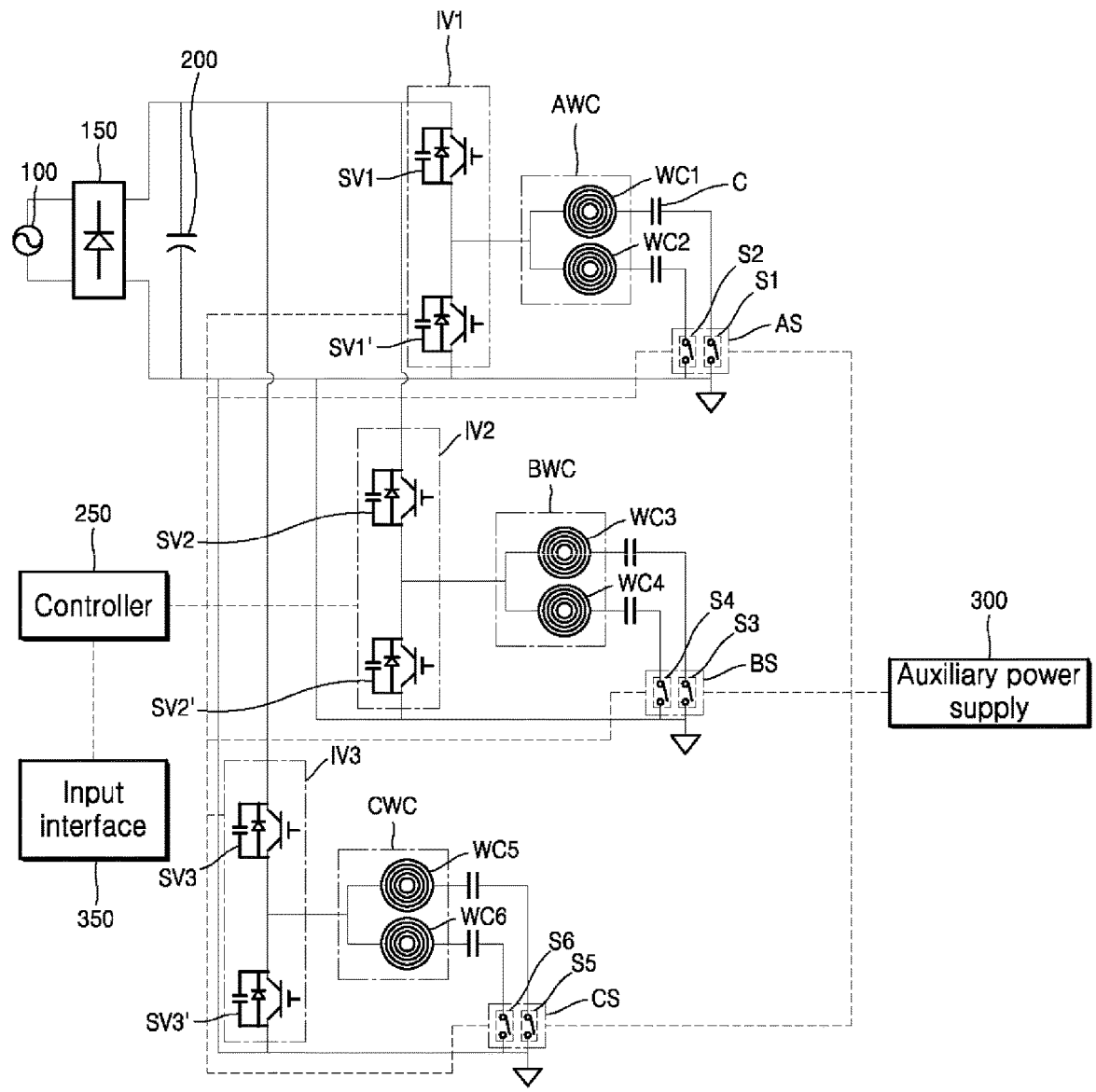
FIG. 3 is a circuit diagram illustrating the induction heating device in FIG. 2.
Figure 4:
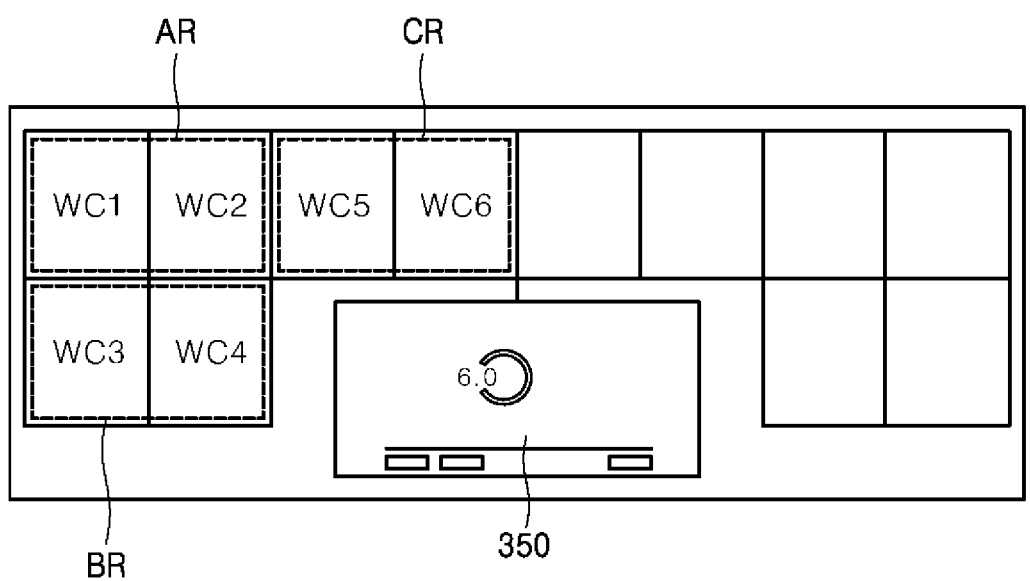
FIG. 4 is a schematic view illustrating an example arrangement of working coils in FIG. 3.
Figure 5:
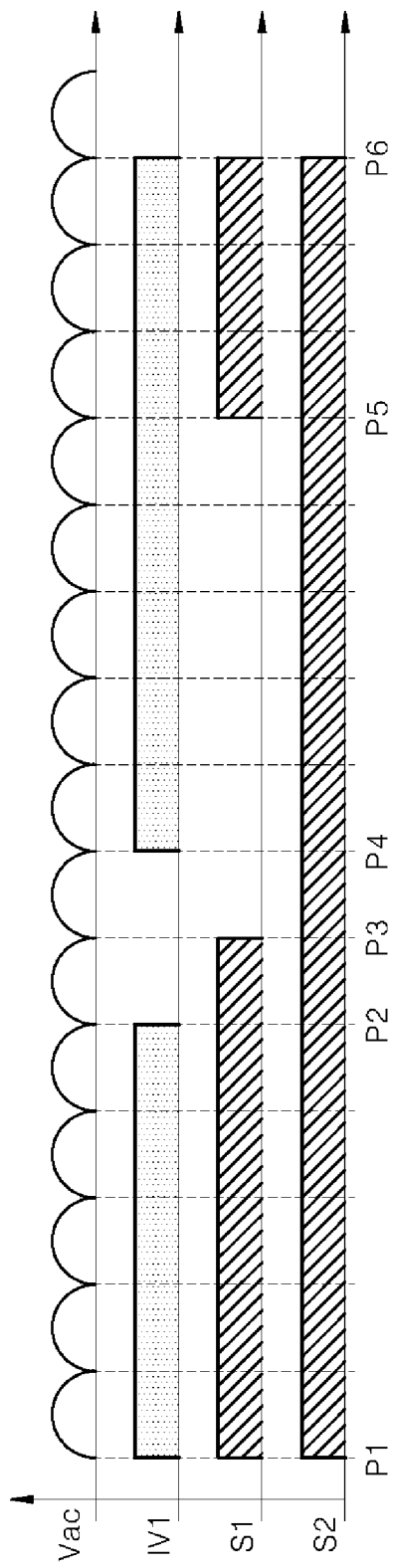
FIG. 5 is a graph illustrating an example of an output control method of the induction heating device in FIG. 2.

FIG. 3 is a circuit diagram illustrating the induction heating device in FIG. 2, FIG. 4 is a schematic view illustrating an example arrangement of working coils in FIG. 3, and FIG. 5 is a graph illustrating an example of an output control method of the induction heating device in FIG. 2.

The induction heating device in FIG. 3 has the same configurations and features as the induction heating device in FIG. 2. For convenience of description, the number and the name of some of the components may differ.

FIG. 3 may illustrate working coils that constitute half the entire area (a zone free area). The induction heating device in FIG. 3 may include an additional inverter, working coil group, working coil, detector group, detector, semiconductor switch unit, and semiconductor switch to constitute the rest half.

For convenience of description, the inverter, the working coil group, the working coil, the detector group, the detector, the semiconductor switch unit, and the semiconductor switch in FIG. 3 are described as examples.

Referring to FIG. 3, an induction heating device 1 may include a power supply 100, a rectifier 150, a DC link capacitor 200, first to third inverters (IV1 to IV3), first to third working coil groups (AWC, BWC, and CWC), first to third semiconductor switch units (AS, BS and CS), a controller 250, an auxiliary power supply 300, and an input interface 350.

The number of the inverter, the working coil group, the working coil, the semiconductor switch unit, and the semiconductor switch may not be limited to the number of the components illustrated in FIG. 3 and may vary.

The power supply 100 may output AC power and may supply the AC power to the rectifier 150, and the rectifier 150 may convert the AC power received from the power supply 100 into DC power and may supply the DC power to the DC link capacitor 200.

The DC link capacitor 200 may be electrically connected in parallel with the rectifier 150.

Specifically, the DC link capacitor 200 may be electrically connected in parallel with the rectifier 150 and may receive a DC voltage from the rectifier 150. The DC link capacitor 200, for example, may be a smoothing capacitor. Accordingly, the DC link capacitor 200 may reduce ripple of the received DC voltage.

As for the DC link capacitor 200 that receives a DC voltage from the rectifier 150, one end of the DC link capacitor may be supplied with a DC voltage, and the other end of the DC link capacitor may be grounded by a potential difference between one end and the other end of the DC link capacitor.

The DC power (or the DC voltage), which is rectified by the rectifier 150 and the ripple of which is reduced by the DC link capacitor 200, may be supplied to at least one of the first to third inverters (IV1 to IV3).

The first inverter (IV1) may include two switching elements (SV1 and SV1'), the second inverter (IV2) may include two switching elements (SV2 and SV2'), and the third inverter (IV3) may include two switching elements (SV3 and SV3'). In some examples, the switching elements SV1, SV1', SV2, SV2', SV3' may include a transistor, metal oxide semiconductor field effect transistor (MOSFET), insulated-gate bipolar transistor (IGBT), a diode, a capacitor, or the like.

The switching elements included in each of the inverters (IV1 to IV3) are alternately turned on and turned off by switching signals received by the controller 250 to convert the DC power into high-frequency alternating current (i.e., resonance current), and the converted high-frequency alternating current may be supplied to the working coil.

For example, the resonance current converted through switching operation of the first inverter (IV1) may be supplied to the first working coil group (AWC), and the resonance current converted through switching operation of the second inverter (IV2) may be supplied to the second working coil group (BWC). Additionally, the resonance current converted through switching operation of the third inverter (IV3) may be supplied to the third working coil group (CWC).

In some implementations, resonance current generated by the first inverter (IV1) may be supplied to at least one of the working coils (WC1 and WC2; first and second working coils) included in the first working coil group (AWC), and resonance current generated by the second inverter (IV2) may be supplied to at least one of the working coils (WC3 and WC4; third and fourth working coils) included in the second working coil group (BWC). Additionally, resonance current generated by the third inverter (IV3) may be supplied to at least one of the working coils (WC5 and WC6; fifth and sixth working coils) included in the third working coil group (CWC).

The working coils (WC1 and WC2) included in the first working coil group (AWC) are electrically connected in parallel with each other, and the working coils (WC3 and WC4) included in the second working coil group (BWC) are also electrically connected in parallel with each other. Additionally, the working coils (WC5 and WC6) included in the third working coil group (CWC) are also electrically connected in parallel with each other.

Accordingly, as illustrated in FIG. 4, the working coils (WC1 and WC2) included in the first working coil group (AWC) are grouped and placed at area A (AR), the working coils (WC3 and WC4) included in the second working coil group (BWC) are grouped and placed at area B (BR), and the working coils (WC5 and WC6) included in the third working coil group (CWC) are grouped and placed at area C (CR).

The working coils may also be placed in the rest vacant space, and the input interface 350 may also be placed at another position except the position illustrated in FIG. 4.

Referring back to FIG. 3, the first semiconductor switch unit (AS) may be electrically connected to the first working coil group (AWC), the second semiconductor switch unit (BS) may be electrically connected to the second working coil group (BWC), and the third semiconductor switch unit (CS) may be electrically connected to the third working coil group (CWC).

Specifically, the first semiconductor switch unit (AS) may include two semiconductor switches (S1 and S2; first and second semiconductor switches), and each of the two semiconductor switches (S1 and S2) may be electrically connected to each of the two working coils (WC1 and WC2) included in the first working coil group (AWC) and may turn on and turn off each of the two working coils (WC1 and WC2).

One end of each of the two semiconductor switches (S1 and S2) may be electrically connected to each of the two working coils (WC1 and WC2), and the other end of each of the two semiconductor switches (S1 and S2) may be electrically connected to the other end (i.e., a ground terminal) of the DC link capacitor 200.

The second semiconductor switch unit (BS) may include two semiconductor switches (S3 and S4; third and fourth semiconductor switches), and each of the two semiconductor switches (S3 and S4) may be electrically connected to each of the two working coils (WC3 and WC4) included in the second working coil group (BWC) and may turn on and turn off each of the two working coils (WC3 and WC4).

One end of each of the two semiconductor switches (S3 and S4) may be electrically connected to each of the two working coils (WC3 and WC4), and the other end of each of the two semiconductor switches (S3 and S4) may be electrically connected to the other end (i.e., a ground terminal) of the DC link capacitor 200.

The third semiconductor switch unit (CS) may include two semiconductor switches (S5 and S6), and each of the two semiconductor switches (S5 and S6) may be electrically connected to each of the two working coils (WC5 and WC6) included in the third working coil group (CWC) and may turn on and turn off each of the two working coils (WC5 and WC6).

One end of each of the two semiconductor switches (S5 and S6) may be electrically connected to each of the two working coils (WC5 and WC6), and the other end of each of the two semiconductor switches (S5 and S6) may be electrically connected to the other end (i.e., a ground terminal) of the DC link capacitor 200.

That is, the other ends of all the semiconductor switches of the first to third semiconductor switch units (AS, BS and CS) may be electrically connected to the other end (i.e., a ground terminal) of the DC link capacitor 200. By doing so, the auxiliary power supply 300 may supply power to all the semiconductor switches through a single output terminal.

When the semiconductor switch is electrically connected between the inverter and the working coil group, an emitter of each of the semiconductor switches floats, and the number of output terminals of the auxiliary power supply 300 increases as many as the number of semiconductor switches. Accordingly, the number of pins of the auxiliary power supply 300 may increase and volume of a circuit may also increase.

In some implementations, where the semiconductor switches are all electrically connected to the ground terminal (i.e., the other end of the DC link capacitor 200), the emitters of the semiconductor switches may not float, but become common. Accordingly, the auxiliary power supply 300 may supply power to all the semiconductor switches through a signal output terminal. When the semiconductor switches are all electrically connected to the ground end, where an emitter of the semiconductor switch does not float, the number of pins of the auxiliary power supply 300 may be reduced, and volume of a circuit may also be reduced unlike when an emitter of the semiconductor switch floats.

In some implementations, the other ends of all the semiconductor switches may be electrically connected to one end (i.e., a portion to which a DC voltage is supplied) of the DC link capacitor 200. When a single output capacity of the auxiliary power supply 300 is too large (i.e. when a single output capacity of the auxiliary power supply 300 is far beyond a pre-configured reference capacity), the other ends of the semiconductor switches included in some of the semiconductor switch units may be electrically connected to the other end (i.e., a ground terminal) of the DC link capacitor 200, and the other ends of the semiconductor switches included in the rest semiconductor switch units may be electrically connected to one end (i.e., a portion to which a DC voltage is supplied) of the DC link capacitor 200.

In some examples, the semiconductor switches may all electrically connected to the ground terminal (i.e., the other end of the DC link capacitor 200).

The induction heating device 1 may further include a resonance capacitor (C) electrically connected between the working coil and the semiconductor switch.

When a voltage is supplied through switching operation of the inverter (e.g., the first inverter (IV1)), the resonance capacitor (C) starts to resonate. When the resonance capacitor (C) resonates, electric current flowing in a working coil (e.g., WC1) electrically connected to the resonance capacitor (C) increase.

Through the process, eddy current are induced to an object placed at an upper portion of the working coil electrically connected to the resonance capacitor (C).

The controller 250 may respectively control operation of the first to third inverters (IV1 to IV3) and the first to third semiconductor switch units (AS, BS and CS).

Additionally, the controller 250 may detect resonance current flowing in at least one of the working coils (WC1 to WC6) included in the first to third working coil groups (AWC, BWC and CWC), and may determine a working coil where an object is placed at the upper portion thereof among the working coils on the basis of a detected value.

That is, the controller 250 may respectively control operation of the semiconductor switches (S1 to S6) included in the first to third inverters (IV1 to IV3) and the first to third semiconductor switch units (AS, BS and CS), and may detect a working coil where an object is placed at the upper portion thereof among the working coils (WC1 to WC6) included in the first to third working coil groups (AWC, BWC and CWC).

The controller 250 may independently control an output of the working coils (WC1 to WC6) included in the first to third working coil groups (AWC, BWC and CWC), and, without a freewheeling diode, may reduce switch stress applied to the semiconductor switch (S1 to S6). Additionally, the controller 250 may control operation of the inverter (IV1, IV2 and IV3) and the semiconductor switch (S1 to S6) at the time point when an input voltage (an AC voltage corresponding to AC power) of the power supply 100 becomes zero.

A control method of the controller 250 is described with reference to FIGS. 3 and 5.

Each of the inverters, the working coil groups and the semiconductor switch units may operate in the same way according to the same theory. Accordingly, the first inverter (IV1), the first working coil group (AWC), and the first semiconductor switch unit (AS) are described as an example.

First, the controller 250 may supply a first control signal with a first pulse width to the first semiconductor switch (S1) to control operation of the first semiconductor switch (S1), and may supply a second control signal with a second pulse width to the second semiconductor switch (S2) to control operation of the second semiconductor switch (S2).

The first semiconductor switch (S1) may be turned on during a period of maintaining the first pulse width (e.g., P1 to P3, P5 to P6; a period of maintaining a pulse width denotes a period corresponding to a pulse width), and the second semiconductor switch (S2) may be turned on during a period of maintaining the second pulse width (e.g., P1 to P6). When the first semiconductor switch (S1) is turned on, the first working coil (WC1) may be turned on, and, when the second semiconductor switch (S2) is turned on, the second working coil (WC2) may be turned on.

In some examples, the controller 250 may be configured to maintain the second control signal during a first period (e.g., P1 to P3) corresponding to the first pulse width and a first off period (e.g., P3 to P5) for which the first semiconductor switch is turned off after the first period. That is, the second control signal may maintain the second pulse width P1 to P6 while the first control signal was interrupted or not supplied for a period from P3 to P5.

In some examples, the first control signal may include a plurality of pulses (e.g., P1 to P3 and P5 to P6) and an off period (e.g., P3 to P5) between two pulses of the plurality of pulses. The controller may be configured to turn off the inverter (e.g., IV1) at a first time point (e.g., P2) before a start (e.g., P3) of the off period and turn on the inverter at a second time point (e.g., P4) before an end (e.g., P5) of the off period. In some examples, a period (e.g., P2 to P4) between the first time point and the second time point may be less than the off period (e.g., P3 to P5).

When the first inverter (IV1) is turned on even in case the first and second semiconductor switches (S1 and S2) are turned on, the first and second working coils (WC1 and WC2) do not operate.

The controller 250 may set an output of the first (WC1) and second (WC2) working coils differently by setting the first and second pulse widths differently.

In case an output of the working coil is 1000 W when a pulse width is set to 100%, the controller 250 may adjust an output of the first working coil (WC1) to 500 W and may adjust an output of the second working coil (WC2) to 700 W by setting the first pulse width to 50% and by setting the second pulse width to 70%.

That is, the controller 250 may adjust the first pulse width to control an output of the first working coil (WC1) and may adjust the second pulse width to control an output of the second working coil (WC2).

The controller 250 may reduce switch stress applied to the semiconductor switch (S1 and S2) by controlling a time point at which the first inverter (IV1) and the first and second semiconductor switches (S1 and S2) are turned off, without a freewheeling diode.

For example, when a period of maintaining the first pulse width is over and a period of maintaining the second pulse width is not over at a third time point (P3), as illustrated in FIG. 5, the controller 250 may turn off the first inverter (IV1) prior to the third time point (P3) (i.e., at a second time point (P2)) and may turn on the first inverter (IV1) again following the third time point (P3) (i.e., at a fourth time point (P4)).

In some implementations, when the periods of maintaining the first and second pulse widths are over at a specific time point, the controller 250 may turn off the first inverter (IV1) prior to the specific time point.

That is, the controller 250 may turn off the first inverter (IV1) before turning off at least one of the first and second semiconductor switches (S1 and S2) and may block resonance current from flowing in a turned-off semiconductor switch. By doing so, stress, which is applied to a semiconductor switch when the semiconductor switch is turned off, may be reduced and, with a reduction in stress, an amount of heat generated in the semiconductor switch may be reduced.

The controller 250 may control operation of the first inverter (IV1) and the first and second semiconductor switches (S1 and S2) at a time point (i.e., a time point of zero-crossing) when an input voltage (Vac; i.e., an AC voltage corresponding to AC power) of the power supply 100 becomes zero or a preset threshold value.

For example, the controller 250 may turn off the first inverter (IV1) and the first semiconductor switch (S1) respectively at the second time point (P2) and the third time point (P3) when an input voltage (Vac) of the power supply 100 becomes zero. Additionally, the controller 250 may turn on the first inverter (IV1) and the first semiconductor switch (S1) respectively at the fourth time point (P2) and the fifth time point (P5) when an input voltage (Vac) of the power supply 100 becomes zero.

The controller 250, as described above, may perform control at the time point when an input voltage (Vac) of the power supply 100 becomes zero. Accordingly, even in case of a delay caused by an abnormal situation that happens while the controller 250 performs control, an adverse effect (i.e., loss) on the device or components may be minimized.

The induction heating device 1, as described above, may control an output of a plurality of working coils (WC1 to WC6) independently by turning on or turning off the plurality of working coils (WC1 to WC6) independently and separately at high speed through the semiconductor switch (S1 to S6) and the controller 250. Further, the controller performs control over the inverter (IV1 to IV3) and the semiconductor switch (S1 to S6) at the time point when an input voltage (Vac) of the power supply 100 becomes zero. Accordingly, even in case of a delay caused by an abnormal situation that happens while the controller 250 performs control, an adverse effect (i.e., loss) on the device or components may be minimized.

Additionally, the induction heating device 1 may turn off the inverter (IV1 to IV3; i.e., an inverter corresponding to a turned-off semiconductor switch) all the time before turning off the semiconductor switch, and may reduce switch stress without a freewheeling diode. Further, with a reduction in switch stress, an amount of heat generated in the semiconductor switch may be reduced, thereby ensuring improved durability and credibility of the induction heating device.

The induction heating device 1 performs control over an output of the working coil (WC1 to WC6) using the semiconductor switch (S1 to S6) and the controller 250 instead of a relay and a freewheeling diode, thereby reducing noise generated at the time of the switchover operation of a relay and satisfying the needs of users. The induction heating device 1 may be used even during a period for which people are sensitive to noise (e.g., at dawn or late at night), thereby ensuring improved usability. Further, the entire volume of the induction heating device 1 as well as the volume of a circuit may be reduced as a relay and a freewheeling diode, which occupies a large volume of the circuit, are removed from the device, thereby ensuring improved usability of space.

An example implementations of the induction heating device 1 is described below with reference to FIGS. 6 and 7.

Figure 6:
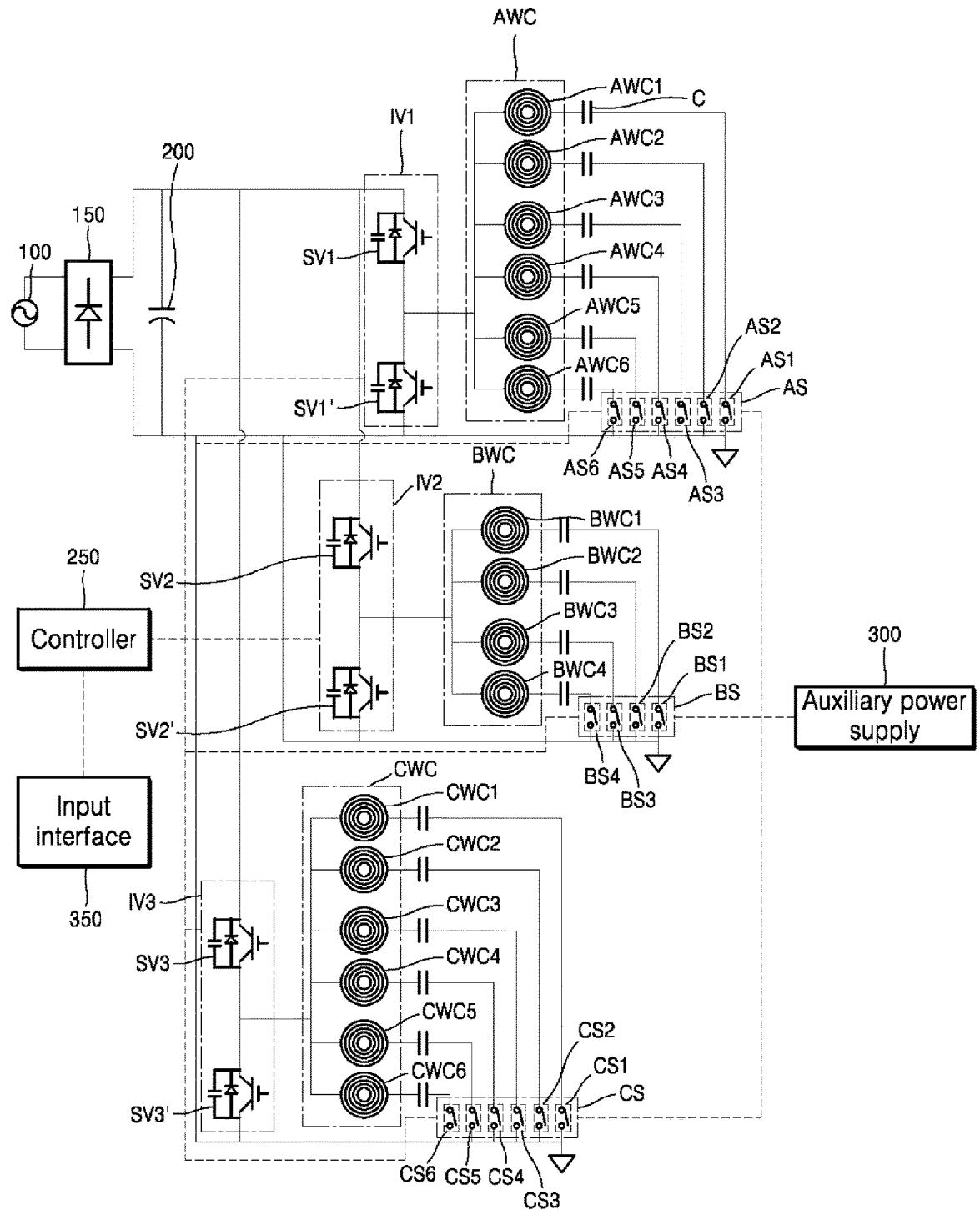
FIG. 6 is a circuit diagram illustrating an example of an induction heating device.
Figure 7:
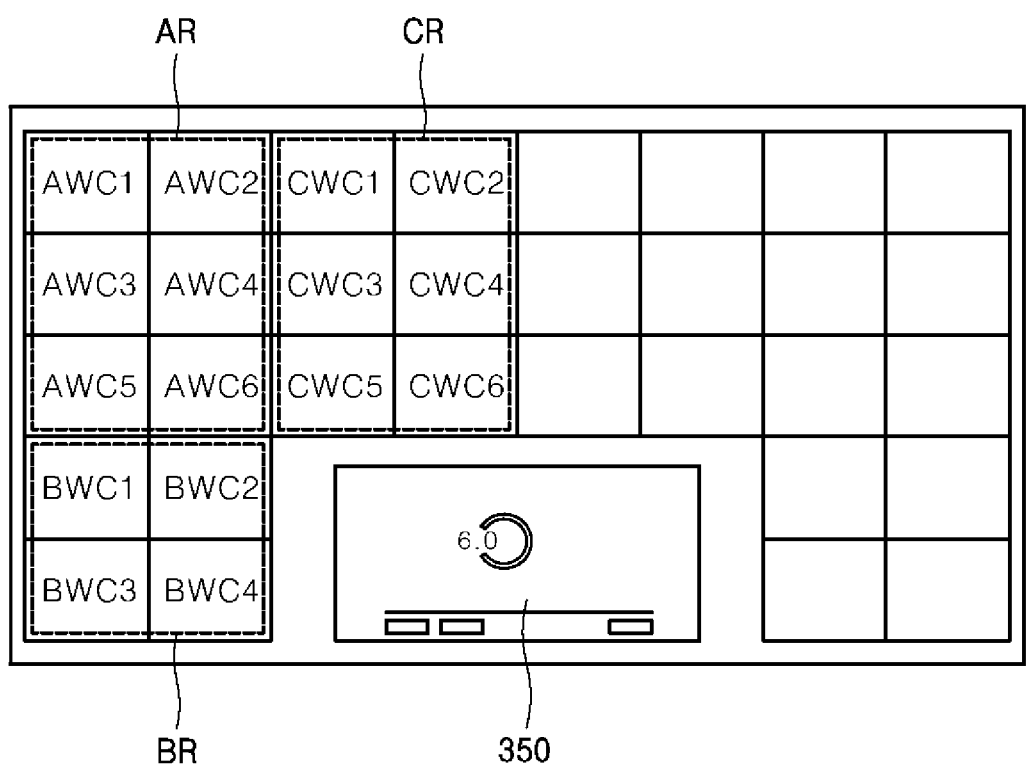
FIG. 7 is a schematic view illustrating an example arrangement of working coils in FIG. 6.

FIG. 6 is a circuit diagram illustrating an example of an induction heating device in FIG. 2. FIG. 7 is a schematic view illustrating an example arrangement of working coils in FIG. 6.

The induction heating device in FIG. 6 has the same configurations and features as the induction heating device in FIG. 3. In some examples, the number and the name of some of the components may differ.

FIG. 6 may illustrate working coils that constitute half the entire area (a zone free area). The induction heating device in FIG. 6 may include an additional inverter, working coil group, working coil, detector group, detector, semiconductor switch unit, and semiconductor switch to constitute the rest half.

For convenience of description, the inverter, the working coil group, the working coil, the detector group, the detector, the semiconductor switch unit, and the semiconductor switch in FIG. 6 are described as examples.

Referring to FIG. 6, the induction heating device 1 may include a power supply 100, a rectifier 150, a DC link capacitor 200, first to third inverters (IV1 to IV3), first to third working coil groups (AWC, BWC and CWC), first to third semiconductor switch units (AS, BS and CS), a controller 250, an auxiliary power supply 300, and an input interface 350.

In some implementations, in the induction heating device 1, the first working coil group (AWC) may include six working coils (AWC1 to AWC6), the second working coil group (BWC) may include four working coils (BWC1 to BWC4), and the third working coil group (CWC) may include six working coils (CWC1 to CWC6). In accordance with the number of the working coils, the first semiconductor switch unit (AS) may include six semiconductor switches (AS1 to AS6), the second semiconductor switch unit (BS) may include four semiconductor switches (BS1 to BS4), and the third semiconductor switch unit (CS) may include six semiconductor switches (CS1 to CS6).

In some examples, as illustrated in FIG. 6, the working coils (AWC1 to AWC6) included in the first working coil group (AWC) may be grouped and placed at area A (AR), the working coils (BWC1 to BWC4) included in the second working coil group (BWC) may be grouped and placed at area B (BR), and the working coils (CWC1 to CWC6) included in the third working coil group (CWC) may be grouped and placed at area C (CR).

The working coil may also be placed in the rest vacant space, and the input interface 350 may also be placed at another position except the position illustrated in FIG. 6.

The present disclosure, described above, may be replaced, modified and changed in various different forms without departing from the technical spirit of the disclosure by one having ordinary skill in the art to which the disclosure pertains. Thus, the present disclosure should not be construed as being limited to the implementations and drawings set forth herein.

The invention claimed is:

1. An induction heating device, comprising:
a working coil group comprising a first working coil and a second working coil that are electrically connected in parallel to each other;
an inverter configured to perform a switching operation to thereby supply a resonance current to at least one of the first working coil or the second working coil;
a power supply configured to output alternating current (AC) power;
a rectifier configured to convert the AC power output from the power supply into direct current (DC) power and to supply the DC power to the inverter;
a first semiconductor switch electrically connected to the first working coil and a ground terminal, the first semiconductor switch being configured to turn on and turn off the first working coil;
a second semiconductor switch electrically connected to the second working coil and the ground terminal, the second semiconductor switch being configured to turn on and turn off the second working coil;
an auxiliary power supply configured to supply power to the first and second semiconductor switches; and
a controller configured to control operation of each of the inverter, the first semiconductor switch, and the second semiconductor switch,
wherein the inverter comprises at least two switching elements that are configured to be alternately turned on and turned off by switching signals received from the controller to thereby convert the DC power into the resonance current, and
wherein the controller is configured to:
turn off the at least two switching elements of the inverter at a first time point at which an input voltage of the power supply becomes zero while keeping at least one of the first semiconductor switch or the second semiconductor switch turned on, the input voltage of the power supply being an AC voltage corresponding to the AC power output from the power supply, and
turn off at least one of the first semiconductor switch or the second semiconductor switch at a second time point at which the input voltage of the power supply becomes zero directly after the first time point while keeping the at least two switching elements of the inverter turned off.

2. The induction heating device of claim 1, wherein the controller is configured to:
supply a first control signal having a first pulse width to the first semiconductor switch and control operation of the first semiconductor switch based on the first control signal, and supply a second control signal having a second pulse width to the second semiconductor switch and control operation of the second semiconductor switch based on the second control signal.

3. The induction heating device of claim 2, wherein the first pulse width and the second pulse width are different from each other.

4. The induction heating device of claim 2, wherein the controller is configured to:
turn on the first semiconductor switch during a first period corresponding to the first pulse width; and
turn on the second semiconductor switch during a second period corresponding to the second pulse width.

5. The induction heating device of claim 4, wherein the controller is configured to:
stop supplying the first control signal at an end of the first period while maintaining supply of the second control signal; and
turn off the inverter prior to the end of the first period, and turn on the inverter again after the end of the first period while maintaining supply of the second control signal.

6. The induction heating device of claim 4, wherein the controller is configured to:
stop supplying both of the first control signal and the second control signal at a specific time point; and
turn off the inverter prior to the specific time point.

7. The induction heating device of claim 4, wherein the controller is configured to:
by turning on the first semiconductor switch, turn on the first working coil, and
by turning on the second semiconductor switch, turn on the second working coil.

8. The induction heating device of claim 4, wherein the controller is configured to:
adjust the first pulse width to thereby control a first output of the first working coil; and
adjust the second pulse width to thereby control a second output of the second working coil.

9. The induction heating device of claim 1, wherein the controller is configured to turn off the first semiconductor switch at the second time point.

10. The induction heating device of claim 9, wherein the controller is configured to maintain an on-state of the second semiconductor switch at the second time point.

11. The induction heating device of claim 1, wherein the controller is configured to maintain an off-state of the inverter until a third time point at which the input voltage of the power supply becomes zero directly after the second time point.

12. The induction heating device of claim 11, wherein the controller is configured to maintain an on-state of the first and second semiconductor switches between the first time point and the second time point.

13. The induction heating device of claim 11, wherein the controller is configured to turn off the first semiconductor switch at the second time point.

14. The induction heating device of claim 13, wherein the controller is configured to turn on the inverter at the third time point.

15. The induction heating device of claim 13, wherein the controller is configured to:
turn on the inverter, the first semiconductor switch, and the second semiconductor switch at one time point (P1) at which the input voltage of the power supply becomes zero before the first time point; and
maintain an on-state of the second semiconductor switch through a plurality of time points at which the input voltage of the power supply becomes zero after the third time point.

* * * * *